April 30, 1940.  J. W. BULLOCK ET AL  2,199,330
PARKING METER
Filed Jan. 16, 1937    7 Sheets-Sheet 1

Inventors
John W. Bullock &
Clarence W. Clements

By Cushman, Darby & Cushman
Attorneys

April 30, 1940.   J. W. BULLOCK ET AL   2,199,330
PARKING METER
Filed Jan. 16, 1937   7 Sheets-Sheet 4

Inventors
John W. Bullock &
Clarence W. Clementz

April 30, 1940.  J. W. BULLOCK ET AL  2,199,330

PARKING METER

Filed Jan. 16, 1937  7 Sheets-Sheet 5

Inventors
John W. Bullock &
Clarence W. Clementz

By Cushman, Darby & Cushman
Attorneys

Inventors
John W. Bullock &
Clarence W. Clementz

By Cushman, Darby and Cushman
Attorneys

April 30, 1940.  J. W. BULLOCK ET AL  2,199,330
PARKING METER
Filed Jan. 16, 1937  7 Sheets-Sheet 7

Inventors
John W. Bullock &
Clarence W. Clementz

By Cushman Darby Cushman
Attorneys

Patented Apr. 30, 1940

2,199,330

UNITED STATES PATENT OFFICE 2,199,330

PARKING METER

John W. Bullock, Miami, and Clarence W. Clementz, Jacksonville, Fla., assignors, by mesne assignments, to said John W. Bullock Application January 16, 1937, Serial No. 121,022

22 Claims. (Cl. 194—74)

The present invention relates to an improved parking device and has as one of its primary objects to associate with a meter, means to initiate the operation of the meter upon the depositing of a coin of the proper denomination and to return the coin when the meter starts. Additionally, means are associated with the meter to stop the same upon the depositing of a proper coin and for returning this coin when deposited within a predetermined period so as to permit free parking for a given period. Further, means are provided in the event of over-parking, to effect stopping of the meter upon the depositing of a coin of the proper denomination as determined by the duration the vehicle has been parked. Means are also associated with the meter to permit the discharge of a coin when deposited within a predetermined period, to stop the meter, and for retaining the coin in the meter when deposited after the expiration of this period.

A further object is to provide a coin controlled meter having a discharge chute and a movable cage, with means operable when a coin of the proper denomination is deposited in the cage to move the coin and the cage into registration with the chute, so as to deposit the coin into the chute, and, at the same time, cause the operation of the meter. Means are also provided to return or withdraw the coin from the meter when the latter starts. Additionally, means are operatively associated with the cage to stop the meter upon the depositing of a proper coin.

A further object consists in providing the coin chute with a discharge opening for withdrawing a coin from the meter, and associating with the opening a gate normally maintained to permit the discharge of a coin through the opening and operatively connected to the indicator whereby upon the expiration of a predetermined period, to close the opening.

Another object is to provide a cam member operable by the movement of the coin cage to control the operative connection of the indicator with the clock or time mechanism.

A further object consists in associating with the coin slots of the cage, means operable by the indicator at the expiration of predetermined periods for preventing the stopping of the meter by a coin of smaller denomination than that required, as shown by the registering or advanced position of the indicator.

A further object comprehends the provision of means for initially starting the meter without requiring the depositing of a coin, said means also being operable at any time within a predetermined period to be actuated to stop the meter. After the expiration of the predetermined period, this means is rendered inoperative, and a coin of the proper denomination has to be inserted into the meter in order to stop the same. In other words, means are provided whereby the meter may be initially started and will continue to operate during the prescribed free parking period and may also be stopped at any time within this period without requiring the introduction of a coin into the meter. Coin controlled means are provided to stop the meter at any time during the paying period, upon the depositing of a coin within the meter of the proper denomination, as determined by the duration the meter has been in operation.

Other objects and advantages of the invention will become apparent from the following description when taken in conjunction with the accompanying claims and drawings.

Referring to the drawings, in which is disclosed a preferred embodiment of the invention.

Referring to the drawings, in which like numerals indicate like parts in the several views, 15 designates the casing or housing of the meter which may be any suitable size and configuration and which is carried by a post 16 suitably secured or embedded adjacent the curb so as to be associated with a parking space.

Within the casing 15 are a pair of spaced supporting plates 17 and 18. A spring-wound clock or time mechanism 19 of any conventional or well known type is secured to the plate 17 by the brackets 20. A shaft 21 connected to the clock spring, not shown, to wind the same, has fastened to it, a wheel 20' which is associated with a flanged disk 22 secured at 23 to a link 24. Opposed shoe members 21' adjustably secured to the flange 22' of the disk 22 engage the periphery of the wheel 20' to rotate the latter when the disk is actuated in one direction to wind the clock spring but permit the free movement of the wheel in an opposite direction. The hub 24' of the link 24 is journalled on the shaft 21 and is secured thereto by a nut 23'. The link 24 is connected by a link 25 and arm 27 to a shaft 26 which extends through one end of the casing and has secured thereto a handle 28. When the handle 28 is actuated, it will cause the rotation of the disk 22, which through the engagement of the shoes 21', rotates the disk 22 and shaft 21 to wind the clock spring. The shoes 21' are initially set at a sufficient pressure to permit them to slide on the periphery of the wheel 20' when the clock spring is wound to about three-fourths of its load.

Figures 3, 8:
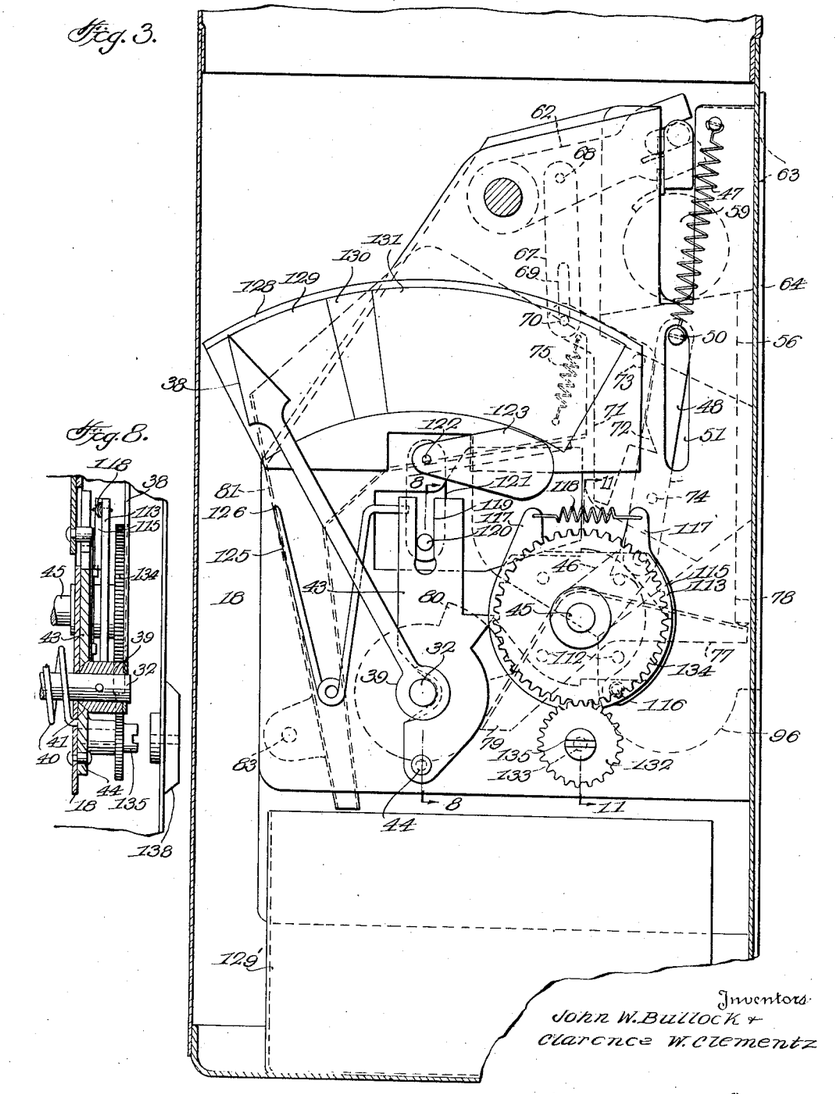
Figure 3 is a sectional view taken substantially along the line 3—3 of Figure 2.
Figure 8 is a sectional view taken substantially along the line 8—8 of Figure 3.
Figure 4:
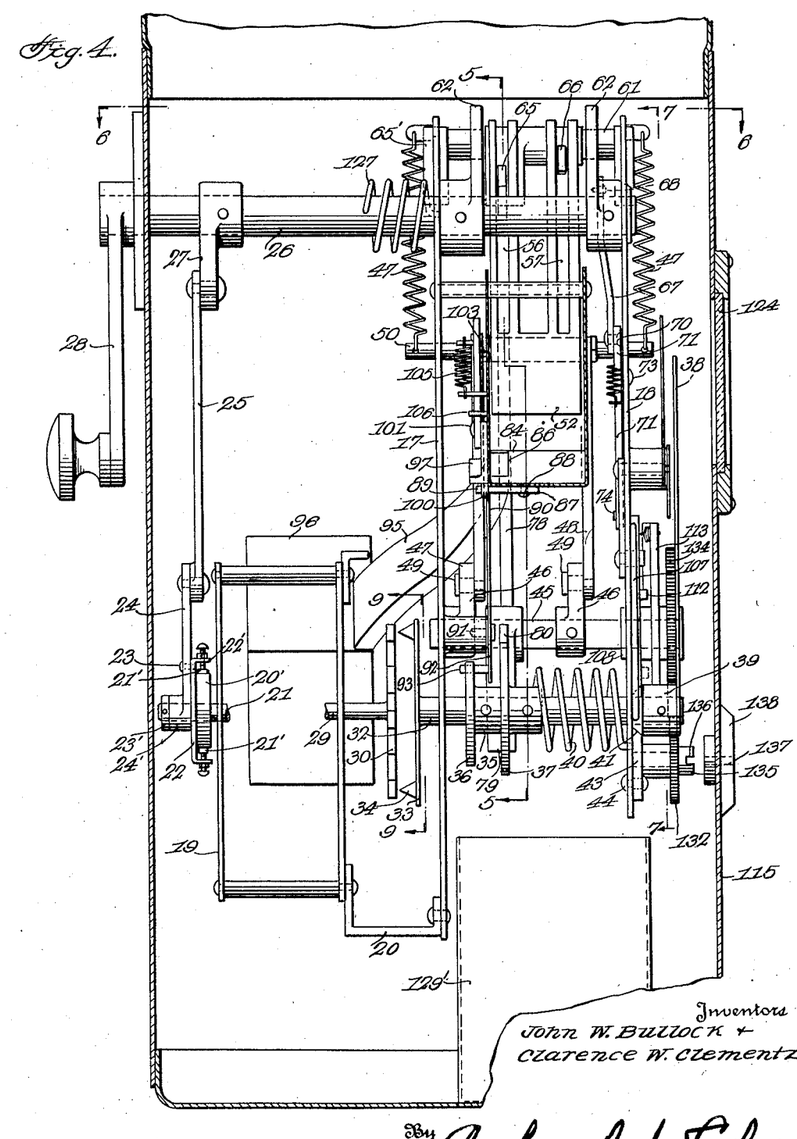
Figure 4 is a sectional view taken substantially along the line 4—4 of Figure 1.
Figure 6:
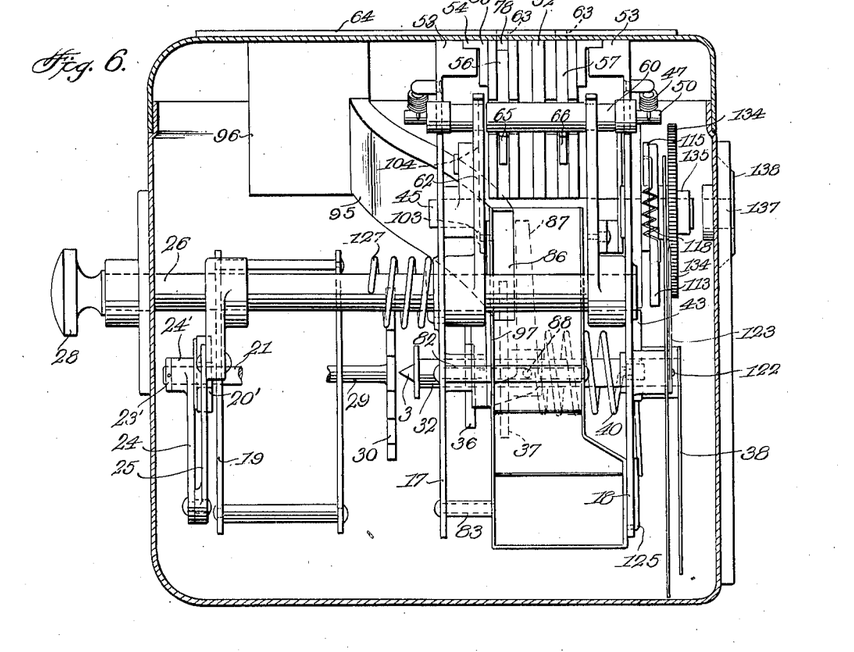
Figure 6 is a sectional view taken substantially along the line 6—6 of Figure 4.
Figure 9:
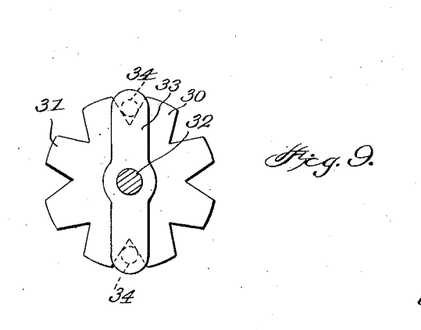
Figure 9 is a sectional view taken substantially along the line 9—9 of Figure 4.

The clock mechanism 19 has its hour hand or time shaft 29 extending outwardly therefrom and provided with a toothed or notched member 30 having a series of peripherally disposed teeth 31. An axially movable meter shaft 32 extends through the plates 17 and 18 and has at its inner end a flat yieldable member 33 (Fig. 9) provided with diametrically opposed prongs 34 arranged to engage the teeth 31 of the member 30. The teeth 31 are not of the true pitch generated type, but preferably are of the type as used in horological instruments. Fastened to the shaft 32 is a sleeve 35 having spaced flanges or collars 36 and 37. An indicator 38 has its hub 39 (Fig. 8) fastened or keyed to the outer end portion of the shaft 32. Confined between the plate 18 and the sleeve 35 and encircling the shaft 32 is a combined compression and torsional spring 40. The spring 40 is fastened at one end to the rotatable sleeve 35 and has its opposite end secured to the fixed plate 18 so that upon the rotation of the shaft 32 in a clockwise direction, the spring is subjected to tension which acts to return the shaft 32 and its associated parts to their normal positions when the shaft 32 is released from its driving connection with the shaft 29. The inner end of the hub 39 is preferably tapered as at 41 so as to coact with a complementary formed opening or recess 42 in the clutch throw-out bar 43, which is pivoted at 44 to the plate 18. The movement of the bar 43 towards and away from the hub 39 controls the axial movement of the shaft 32 to effect the connection and disconnection of the prongs 34 with the teeth 31 on the time shaft 29. Positioned above and to one side of the meter shaft 32 is a lay shaft 45 journalled in the spaced plates 17 and 18. Fastened to the shaft 45 are a pair of spaced collars or arms 46, to which are connected the links 48 by the threaded bolts 49 (Fig. 4). The upper ends of the links 48 are revolubly mounted on a shaft or rod 50 which is vertically movable in the slots or openings 51 formed in the sides of the plates 17 and 18 (Fig. 3). As shown, the shaft 50 extends through a coin cage 52 to be movable therewith. A pair of spaced coiled springs 47 connected to the shaft 50 and the sides of the plates 17 and 18 act to return the cage 52 to its normal position when the latter is moved therefrom. Each of the plates 17 and 18 at one side is provided with an enlargement 53 (Fig. 6) having a cut-out guide portion or milled guide 54 which receives a substantially L-shaped slipper 55 attached to the sides of the cage 52 for the purpose of constituting a flange for guiding the cage during its vertical movement.

Figure 2:
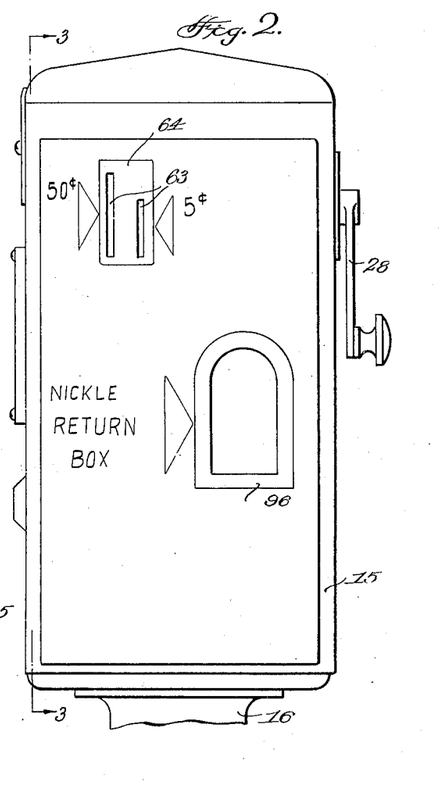
Figure 2 is a side view of the meter.
Figure 13:
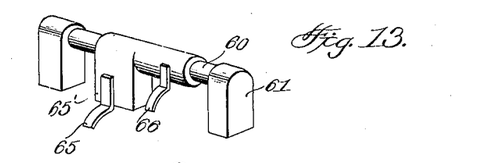
Figure 13 is a perspective view of the coin retaining member.
Figure 14:
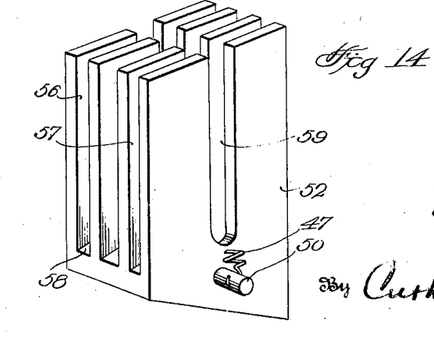
Figure 14 is a perspective view of the coin cage.

The cage 52 (Fig. 14) may be provided with spaced longitudinally disposed coin slots 56 and 57 which have their bottoms downwardly inclined as at 58. The slots 56 and 57 are of various depths and widths so as to accommodate coins of different diameters. The cage is also provided with a vertically disposed slot or recess 59 which loosely receives a coin retaining and actuating member 60 having depending guides 61 and which is carried by the spaced forked levers 62 fastened to the operating shaft 26 so as to be movable therewith. When the cage 52 is in its normal upward position, the slots 56 and 57 register with complementary openings 63 provided in the plate 64 attached to the side of the casing (Fig. 2), and the coin retaining member 60 is positioned above the cage a sufficient distance to have the fingers 65 and 66 thereon (Fig. 13) extend into their respective slots 56 and 57 a sufficient distance to arrest a coin of the proper denomination that is inserted in one of the slots. As shown the member 60 has a depending actuating arm 65' to which the finger 65 is secured.

Figure 7:
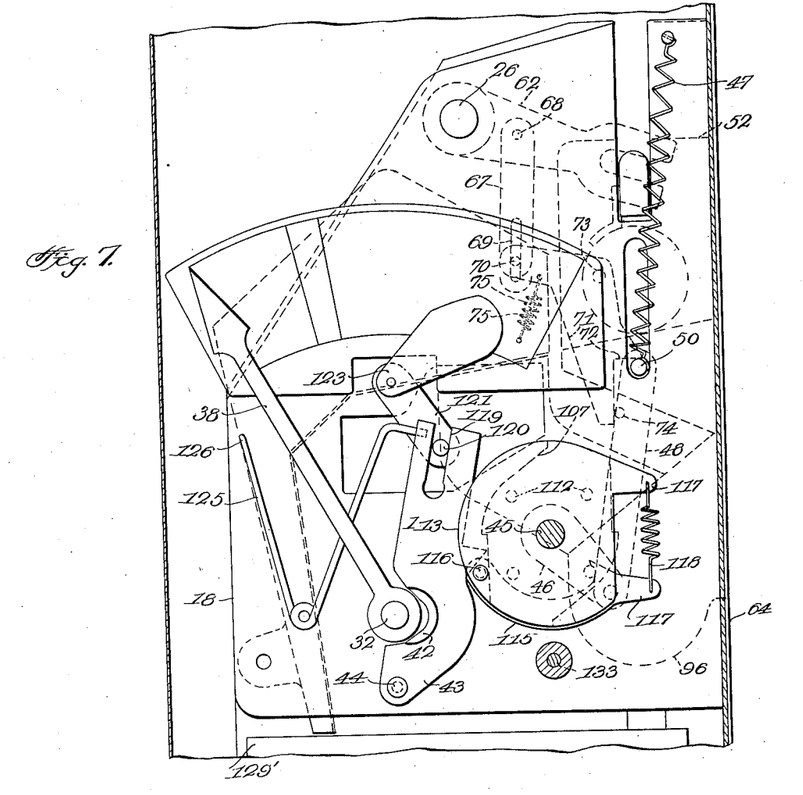
Figure 7 is a sectional view taken substantially along the line 7—7 of Figure 4.

To one of the bifurcated levers 62 is connected a link 67 (Fig. 3) as at 68, and this link has an elongated slot 69 which receives a pin or stud 70 on one arm of a bell crank lever 71. The other arm of the bell crank has a projection 72 which normally assumes the position as shown in Fig. 3. The bell crank lever 71 is pivoted to the frame 18 as at 73 and is arranged when the levers 62 are swung downwardly to be moved so that the projection 72 is positioned above and engages the rod 50 (Fig. 7). A stop 74 is provided to limit the outward movement of the bell crank 71 while a spring 75 fastened to the plate 18 acts to normally urge the projection 72 outwardly but is prevented from doing so by the pin 70 engaging the lowermost portion of the slot 69 when the parts are in their raised or normally inoperative positions.

Figure 5:
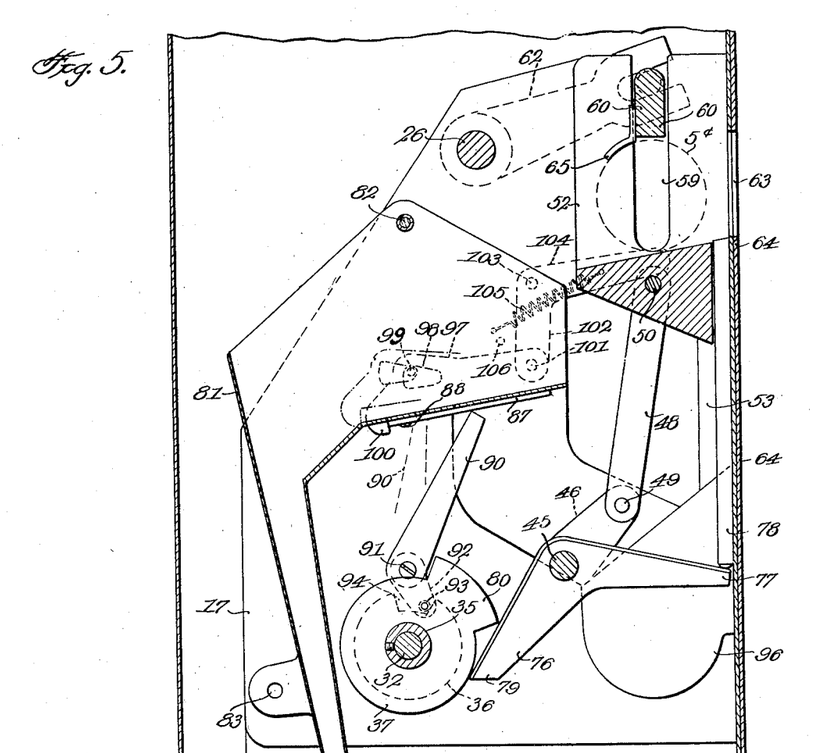
Figure 5 is a sectional view taken substantially along the line 5—5 of Figure 4.
Figure 10:
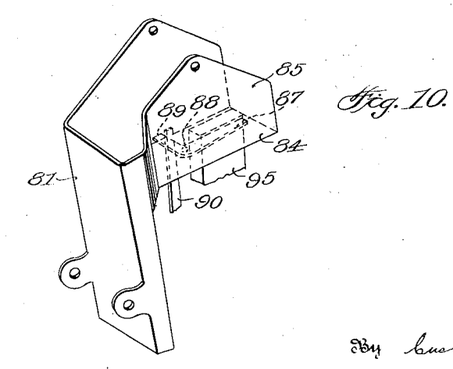
Figure 10 is a detail perspective view of the coin chute.

The lay shaft 45 has fastened to it a bell crank lever 76 (Fig. 5) having its arm 77 engaging the underside of a vertically movable slide plate 78 which in its extreme upward position fits into a groove in the front wall of the slot 56 (Fig. 6) to close the same and to prevent the introduction of a coin therein. The other arm 79 of the bell crank 76 is arranged to engage an outwardly projecting cam surface 80 on the flange or disc 37, so as to cause the actuation of the slide plate 78 at predetermined intervals during the operation of the meter. A coin chute 81 (Fig. 5) is secured as at 82 and 83 to the plates 17 and 18 and is provided with an outwardly extending portion or tray 84 (Fig. 10) having a front end opening 85 with which the slots 56 and 57 in the coin cage 52 are arranged to register when the latter is moved to its lowermost position. The bottom of the tray 84 of the chute has an opening 86 which aligns with the slot 56 when the cage is in its lowermost position and is arranged to be closed by a movable gate 87 pivoted as at 88 to the underside of the tray 84. The gate 87 has a bent arm 89 projecting beyond one side of the chute and arranged to be engaged by a lever or arm 90 pivoted as at 91 to the frame 17 (Fig. 5). The lever 90 also has a depending portion 92 that carries a pin 93 which extends into a peripherally disposed slot 94 in the flange 36 of the sleeve 35. The length of the slot 94 is such as to permit the rotation of the sleeve 35 a predetermined distance in a clockwise direction before the pin 93 is brought into engagement with the periphery of the flange 36 to move the lever 90 from its full line position towards its dotted line position as shown in Fig. 5, which movement brings the lever 90 into engagement with the arm 89 on the gate 87 and moves the latter across the opening 86, to close the same and prevents a coin from falling therethrough. The opening 86 communicates through a chute 95 with a cup 96 (Fig. 2) on one side of the casing 15 so as to remove a coin falling through the opening 86 from the meter.

A lever 97 (Fig. 5) has a slot 98 which receives a fixed pin 99 extending from the plate 17 and is provided at one end with a hook-like portion 100 arranged to engage the bent portion 89 of the gate 87 to maintain the latter out of the path of the opening 86 at predetermined intervals during the operation of the meter. The lever 97 is pivotally connected at 101 to the arm 102 of a bell crank lever, which in turn is pivoted at 103 to the plate 17. The other arm 104 of the bell crank extends outwardly so that when the coin cage 52 is in its uppermost position the arm 104 will be positioned above and engage the shaft 50. A spring 105 conected to the bell crank and the plate 17 acts to release the bell crank from the position shown in Fig. 5. A stop 106 opposes the inward movement of the bell crank and also regulates the lateral throw or movement of the lever 97. Downward movement of the cage 52 releases arm 104 from the shaft 50 and imparts an arc-like motion to lever 97 so as to cause the hook 100 to engage arm 89. The spring 105 holds the hook until the cage 52 is returned ot its normal position.

Figures 11, 12:
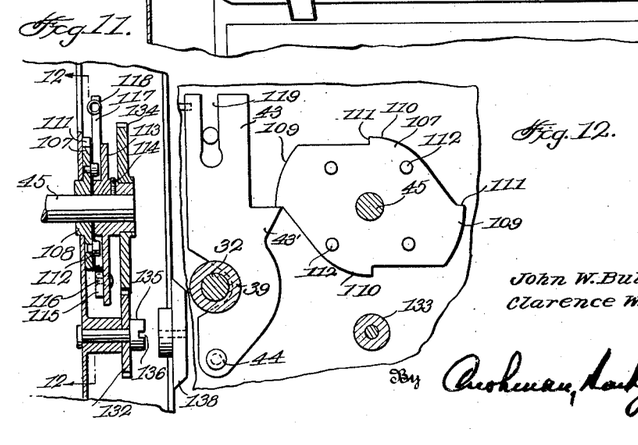
Figure 11 is a sectional view taken substantially along the line 11—11 of Figure 3.
Figure 12 is a sectional view taken substantially along the line 12—12 of Figure 11.

A cam member 107 has its hub 108 extending through the plate 18 and is revolubly mounted on the lay shaft 45 (Fig. 11). The cam 107 is preferably formed of substantially oval shape having opposed curved sides 109 at the ends of its major diameter and curved sides 110 at the extremities of its minor diameter. Each of the sides 109 and 110 is also formed with an indent portion 111. Projecting outwardly from the plate 107 are a series of spaced pins or lugs 112 arranged to be associated with a member or disc 113 keyed as at 114 to the lay shaft 45. A hook member 115 (Fig. 3) is pivoted at 116 to the member 113. The members 113 and 115 have upwardly projecting spaced arms 117 connected by a spring 118. It will be seen that as the member 113 is rotated by the shaft 45 it will impart movement to the member 115 and as the latter is brought into engagement with one of the pins 112 it will rotate the cam 107 in a clockwise direction substantially 90° so as to move either the major or minor axis of the disc 107 towards the clutch throw-out bar 43 to cause the engagement of one of the indents 111 with the toe 43' of the bar 43.

Figure 1:
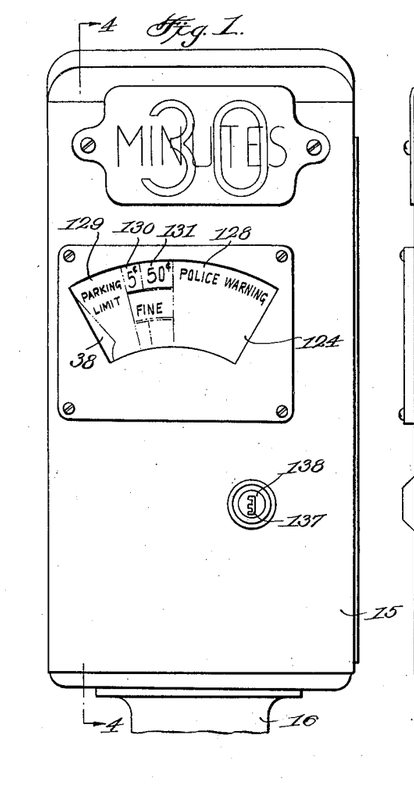
Figure 1 is a front face view of the meter.

The throw-out bar 43 has an elongated slot 119 in its upper end which receives a stud 120 on a link 121 fastened to a shaft 122 which carries a signal or flag 123 so that as the throw-out bar 43 is moved towards and away from the meter shaft 32 it will simultaneously move the flag either towards or away from a window 124 in the front face of the casing 15 (Fig. 1). A spring 125 is fastened at one end as at 126 to the plate 18 (Fig. 7) and has its opposite end engaging the adjacent side of the throw-out bar 43 to urge the bar away from the meter shaft 32 and against the action of the cam 107.

For the purpose of illustration, the parts of the meter have been constructed and so calibrated as to be initially operated upon the depositing of a 5¢ piece in the slot 56 to permit the free parking of a vehicle in the space with which the meter is associated for a period of thirty minutes. If the car is over-parked a period between thirty and forty minutes, a fine of 5¢ must be deposited in the slot 56 to effect the stopping of the meter, and if a car should over-park for a period of between forty and sixty minutes, a fine of 50¢ must be paid.

The meters require the attention of a traffic officer who should visit each meter once every thirty minutes in order to ascertain if the meter is in operation. If a car has over-parked, it will be shown by the position of the indicator 38. The officer thereupon takes the license number of the car so as to have a record in the event the driver leaves without paying.

Assuming it is desired to park a car in a space with which one of the meters is associated and that the parts are in their normal inoperative position as shown in Figure 3, the operator of the vehicle inserts a 5¢ piece in the slot 63 which is of suitable dmensions to receive a coin of this denomination. The inward movement of the coin is arrested by being brought into engagement with the finger 65 and the coin is now positioned between the bottom of the slot 56 and the retaining member 60 to effect an operative connection between the shaft 26 and the cage 52. Upon the manual actuation of the handle 28, the shaft 26 is rotated in a clockwise direction which causes the levers 62 to be moved downwardly and the clock mechanism to be wound. This movement of the lever forces the coin cage 52 to be moved to bring the slots 56 and 57 into registration with the opening 85 in the chute 81. Simultaneously, the lever 67 actuates the bell crank 71 so that the hook 72 is positioned over and in engagement with the shaft 50 by the action of spring 75, so that these parts now assume the position shown in Fig. 7. Rotary motion is also transmitted through the links 48 to the lay shaft 45 which causes the member 113 to be moved in a clockwise direction through an arc of 90°. At the same time, the hook member 115 is moved to engage one of the pins 112 and impart a similar movement to the cam 107.

As one of the sides 109 of the cam 107 has previously been moved to the position shown in Figure 12, the adjacent indent 111 rests on the toe 43', while the cam 41 of the hub 39 maintains the meter shaft 32 out of engagement with the time shaft 29. It will be observed that the engagement of the toe 43' with the indent 111 permits the rotative movement of the cam 107 in a clockwise direction, but acts to prevents its rotation in an opposite direction. The clearance between the cam surface 42 on the bar 43 allows for a slight play in the movement of the bar to permit the toe to engage the indent. The rotary movement of the cam 107 imparted by reason of the engagement of the hook member 115 with one of the pins 112, moves the major diameter 109 away from the toe 43' and causes the minor diameter 110 to be presented to the toe, with the result that the spring 125 forces the bar 43 to the right (Fig. 7), thus releasing the bar from the hub 39 of the indicator. The spring 40 then urges the prongs 34 into engagement with the teeth 31 to operatively connect the meter shaft 32 with the time shaft 29 which causes the indicator to begin its operation. The clockwise movement of the bar 43 away from the shaft 32 actuates the shaft 122 through the link 121, which in turn raises the flag 123 so that it is visible through the window 124 and shows that the meter is now in operation. The downward movement of the links 48 frees the bell crank arm 104 from engagement with the shaft 50 and the spring 105 moves the hook 100 on the lever 97 into engagement with the arm 89 of the gate 87 to maintain the latter away from the opening 86.

Upon the release of the handle 28, the spring 127 on the shaft 26 returns the retaining member 60 to its normal position, thus allowing the 5¢ piece to be discharged into the tray 84 of the chute. The hook 72 is arranged to engage the shaft 50 until the retaining member 60 is returned by the rotation of the shaft 26 to its normal position, thus providing a time interval to permit the coin to roll out of the cage 52. When the retaining member returns to its normal position, the engagement of the pin 70 with the bottom of the slot 69 acts to return the bell crank to the position shown in Figure 3. At the same time, the springs 47 restore the cage 52 to its normal upward position so that the slots 56 and 57 register with their complementary slots 63 in the plates 64 and are positioned to receive another coin of the proper denomination to effect the stopping of the meter. The recess 94 in the disc 36 is of such length that the pin 93 will not disturb the position of the lever 90 until the meter has been operating for a period in excess of thirty minutes. The gate 87 is normally held in its retractive position out of the path of the opening 86 by the lever 97, so that the coin in the slot 56 will be carried by the inclined bottom 58 to the opening 86 and discharged by the chute 95 into the cup 96 so as to be withdrawn or removed from the meter. Thus simple and efficient means are provided for operating the meter upon the depositing of a coin of the proper denomination and for returning the coin after the meter starts.

Assuming that a free parking period of half an hour is permitted, at any time within this period a 5¢ piece deposited in the slot 63 will cause the cage to be lowered upon the actuation of the handle 28. As one of the sides 110 of the disc 107 is now engaged by the toe 43' and the throw-out bar 43 is moved away from the meter shaft by the action of the spring 125, it will be noted that upon the downward movement of the coin cage and its associated parts, the lay shaft 45 will actuate the cam 107 through the hook member 115, and thus move the adjacent side 109 of the disc 107 into engagement with the projection on the bar 43 so as to force the same against the pressure of the spring 125 to its vertical position (Fig. 3). This movement brings the tapered surface 42 of the member 43 into engagement with the surface 41 of the hub on the indicator, thus moving the meter shaft axially relatively to the time shaft to disconnect the indicator 38 from the time mechanism. As the meter shaft 32 has not been operating more than half an hour, the lever 90 will be maintained in its inoperative position so that the coin deposited in the portion 85 of the chute 81 will fall through the opening 86 and be withdrawn from the meter through the box 96. Thus, means are provided to permit free parking for any selected or predetermined period as may be desired.

In the event that a car is over-parked, say for example thirty-five minutes, the driver when he returns will, upon inspecting the meter, note the position of the indicator 38 which will register on the dial plate 128 and show a 5¢ fine must be paid. Upon depositing such a coin in the opening 63, the cage 52 will be lowered so as to present the coin into registration with the portion 85 of the chute. Since the meter has been operated for over a period of thirty minutes, the disc 36 on the shaft 32 has been rotated a distance sufficient to cause the pin 93 on the lever 90 to ride the surface of this disc and be moved to the left as shown in Figure 5, to actuate the arm 89 of the gate 87 and move the latter across the opening 86 to close the same. A coin now deposited in the chute will pass over the opening 86 and be conducted to a coin box 129' in the bottom of the meter.

If the fine for over-parking as registered by the indicator 38 exceeds 5¢ and requires 50¢ to actuate the meter so as to stop the same, the disc 37 will have in the meantime been rotated a sufficient distance to move the projection 80 thereon into engagement with the arm 79 of the bell crank 76 which, in turn, elevates the slide plate 78 so as to move the latter upwardly through the slot 58 and closes the opening controlling admission of a 5¢ piece to the coin cage.

Should a car be parked in excess of forty minutes, the indicator 38 will be positioned in the space which indicates a fine of 50¢ must be paid to stop the meter. Upon the depositing of a 50¢ coin in the slot 57, the coin will be engaged by the finger 66 on the member 60 suspended in the slot 59 and upon the cage being moved downwardly and brought into registration with the tray 85, the coin will be discharged into the chute 81 and conveyed to the coin box 129'.

After the expiration of forty minutes the cam 36 will be rotated to bring the projector 80 into engagement with the arms 79 of the bell crank 76, which raises the slide 78 into the slot 56 so as to preclude the depositing of a coin through this slot to effect the stopping of the meter. Thus, it will be seen that simple, efficient, and positive means are provided for insuring the stopping of the meter only upon the depositing of a coin into the meter of the proper denomination and as determined by the registering position of the indicator 38.

The downward movement of the levers 62 is limited so that the space between the finger 65 and the bottom of the slot 56 is such as to permit a coin smaller than a nickel to pass through the slot, thus precluding the operation of the cage only by a coin of the proper denomination. When the meter is stopped, the tension built up in the spring 40 acts to return the indicator 38 and its associated parts to their normal positions.

The dial plate 128 is shown calibrated so that the space 129 indicates the movement of the indicator 38 from its normal or zero position, a distance of 15° or thirty minutes, which represents the free parking period the meter is set to permit. The space 130 of the dial represents a distance of 5° or ten minutes of over-parking, while the space 131 indicates 10° or a period of between ten minutes and 30 minutes overparking.

A gear 131 keyed to a shaft 133 (Fig. 3) meshes with a gear 134 keyed to the lay-shaft 45, and is provided with a hub 135 having a keyway 136 which registers with a key opening 137 (Fig. 4) formed in a tumbler 138 connected to the outer face of the casing 15, for the purpose of receiving a key for permitting the release of the meter shaft 32 from engagement with the time shaft 29 by the policeman when a car parked in the space associated with the meter leaves without payment of the proper fee.

While the coin cage 52 of the meter has been shown to receive a 5¢ piece and a 50¢ piece to effect the stopping and starting of the meter, it will be manifest that the cage may be provided with additional openings for receiving coins of intermediate denominations, such as a 10¢ piece and a 25¢ piece, and that the slots formed in the cage for these coins may each have associated therewith a slide similar to the slide 78 for closing the entrance of a coin into the particular slot at the expiration of the period required to stop the meter by the depositing of a coin in this particular slot. Further, the duration of free parking may be varied to cover any period desired by the simple expedient of adjusting or regulating the movement of the meter shaft 32 relative to the scale on the dial plate 128.

Instead of requiring a coin to be deposited into the meter to initiate the starting and stopping of the same during the free parking period, the coin retaining and actuating member 60 may also be utilized to coact with means associated with the cage 52 and movable therewith, for causing the cage to be displaced from its normal inoperative position so as to effect the starting and stopping of the meter upon the actuation of the handle 28.

Figure 15:
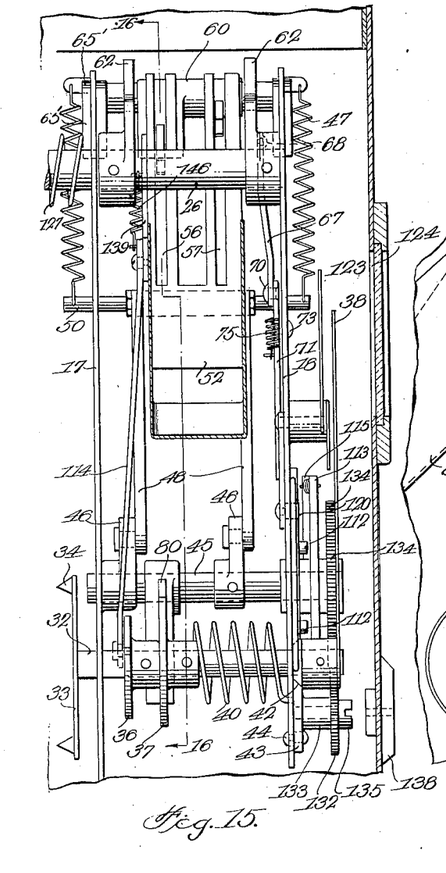
Figure 15 is a vertical section of a modified form of the meter.
Figure 16:
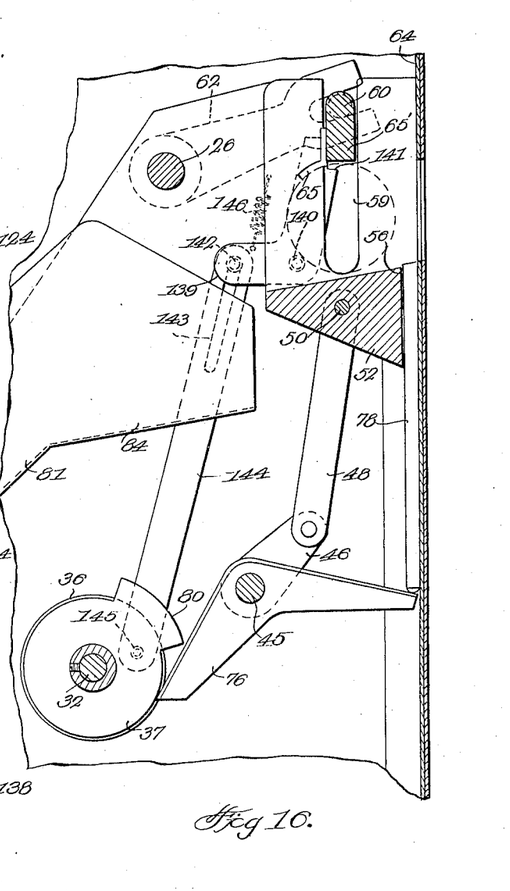
Figure 16 is a section taken substantially along the line 16—16 of Figure 15.

As shown in Figures 15 and 16, this may be effected by pivotally connecting the bell crank 139 to the side of the cage 52 as at 140 and adjacent to the plate 17. The upper arm of the bell crank 139 has a reduced shoulder portion 141 normally positioned so as to be in the path of movement of the arm 65' of the retaining member 60. The lower or horizontal arm of the bell crank 139 has a pin 142 extending into an elongated slot 143 in the upper end portion of a link 144. The lower end of the link 144 is eccentrically connected as at 145 to the flange 36 of the sleeve 35 so as to be actuated upon the rotation of the flange during the operation of the meter. Thus lost motion means are provided for connecting the bell crank member 139 to the shaft 32 to permit the independent movement of the bell crank relative to the meter shaft and for effecting the actuation of the bell crank by the meter shaft after the latter has been in operation for a predetermined period.

The shoulder 141 on the upper arm of the bell crank 139 may be normally urged in the path of the arm 65' by a coil spring 146 connected at one end to the cage 52 and at its opposite extremity to the horizontal arm of the bell crank 139. The cage 52 is operatively connected to the lay shaft 45 by the links 48 and the arms 46 and is substantially similar in construction and operation to the same parts previously described. Since in this form of the invention, it is not necessary to initiate the operation of the meter by the depositing of a coin therein or provide means to discharge the coin deposited during the free parking period, the gate 87 for controlling the opening 86 in the chute 81 and the means for actuating the same are dispensed with.

In operation, assuming that the meter is set to permit a free parking period of thirty minutes and to require the same fees for a prescribed time or for overparking as shown in the form of the invention previously described, and that the parts are in their normal inoperative positions as shown in Figure 16, it will be seen that upon the actuation of the shaft 26 by the handle 28, the arm 62 will be moved downwardly, causing the depending portion 65' of the member 60 to engage the shoulder 141 of the bell crank 139 which in turn moves the cage 52 downwardly so as to actuate the shaft 45 and cam 107 to effect the operative connection of the meter shaft 32 with the time shaft 29 to start the meter. During this downward movement, the pin 142 rides in the slot 143 so as not to affect the position of the link 144. Upon the release of the handle 28, the shaft 26 and the retaining member 60 are returned to their normal inoperative positions by the built up tension of the spring 127 and the cage 52 is temporarily held in its lower position by the hook 72 on the lever 71 in the manner as previously described and as shown in Figure 7. Upon release of the hook 72 from the rod 50, the cage 52 is returned to its normal position without affecting the operation of the meter. As the meter has been set to permit a free parking period of thirty minutes, the link 144 is so connected to the flange 36 that during this period, the upper arm of the bell crank 139, while being moved away from the arm 65', will not clear the same until the thirty minute period has expired. Thus, it will be seen that at any time within the prescribed free parking period, the handle 28 may be actuated and the arm 65' will be brought into engagement with the shoulder 141 so as to move the cage 52 in order to stop the meter.

After the expiration of the free parking period, the meter operates in substantially the same manner as previously described, so that a proper coin must be deposited in either of the slots 56 and 57 as determined by the position of the indicator 38, in order to effect the stopping of the meter. Assuming that a car has been parked in a space associated with the meter for thirty five minutes, it will require a five cent piece to be positioned in the slot 56 to operatively connect the arm 62 with the cage 52 to move the latter. This coin is held in proper position in the slot 56 by the finger 65. During this period, the shoulder 141 of the bell crank 139 is out of the path of the arm 65' so that the meter is rendered inoperative unless a coin of the proper denomination is positioned in the appropriate slot of the cage 52. Upon the proper coin being deposited in the cage 52, the handle 28 may be actuated to move the cage into registration with the tray 84. At the same time, the shaft 45 is rotated by the link 48 and in turn actuates the cam 107 so that the bar 43 is moved away from the meter shaft 32 by the spring 125 which stops the meter. Upon the release of the handle 28, the arm 62 and member 60 are returned to their normal positions and the coin is discharged into the chute 81 and conducted to the box 129' (Fig. 3). The hook 72 which temporarily holds the arm 50 in the position as shown in Figure 7, is then released and the cage 52 is returned to its upper position, and the parts connected to the meter shaft 32 are returned to their initial positions. The counterclockwise movement of the flange 36 permits the spring 146 to urge the shoulder 141 of the bell crank 139 into the path of the arm 65' so that these parts are again reset to effect the initial starting of the meter.

Thus, it will be seen that fool proof means are associated with the meter which may be operated either by the insertion of a coin or by means associated with the cage 52 to start the meter. Further, that at any time during the free parking period for which the meter is set, the latter may be stopped by depositing a coin into the meter or by the means associated with the cage. After the expiration of the free parking period, it is necessary, in order to stop the meter, to deposit therein a coin of the proper denomination as indicated by the registered position of the indicator 38.

It is to be understood that the forms of the invention shown and described are merely illustrative of preferred embodiments, and that such changes may be made without departing from the spirit of the invention as fall within the purview of one skilled in the art and the scope of the appended claims.

We claim:

1. A coin controlled meter including an indicator, a time shaft releasably connected to the indicator, a coin chute, a cage arranged to be moved into and out of registration with the chute, retaining means for maintaining a coin in the cage, means when a coin is deposited in the cage for moving the same to position the coin in registration with the chute, means for moving the retaining means to permit the discharge of the coin into the chute, and means operable by the movement of the cage to connect the indicator with the time shaft.

2. A coin controlled meter including an indicator, a time shaft releasably connected to the indicator, a coin chute, a cage arranged to be moved into and out of registration with the chute, retaining means for maintaining a coin in the cage, means when a coin is deposited in the cage for moving the same to position the coin in registration with the chute, means for moving the retaining means to permit the discharge of the coin into the chute, means operable by the movement of the cage to effect the connection of the indicator with the time shaft, means for returning the cage to its normal position, and means for discharging the coin from the meter.

3. A coin controlled meter including an indicator shaft, a time shaft adapted to be connected to the indicator shaft, means for connecting and disconnecting said shafts, displaceable means for effecting the operation of said connecting means, a coin chute, a coin cage arranged to be moved in and out of registration with the chute, retaining means for maintaining a coin in the cage, said displaceable means being operatively connected to the cage, actuating means arranged to move the cage and displaceable means to operate the connecting means to connect said shafts when a coin deposited in the cage is engaged by the retaining means, said movement of the cage aligning the cage with the coin chute, means for returning the actuating means and the retaining means to their original position when the actuating means is released, and means for discharging the coin into the chute when the retaining means is released.

4. A coin controlled meter including an indicator shaft, a time shaft adapted to be connected to the indicator shaft, means for connecting and disconnecting said shaft, displaceable means for effecting the operation of said connecting means, a coin chute, a coin cage arranged to be moved in and out of registration with the chute, retaining means for maintaining a coin in the cage, said displaceable means being operatively connected to the cage, actuating means arranged to move the cage and displaceable means to operate the connecting means to connect said shafts when a coin deposited in the cage is engaged by the retaining means, said movement of the cage aligning the cage with the coin chute, means for returning the actuating means and the retaining means to their original position when the actuating means is released, means for returning the cage to its original position without affecting the operative connection of said shafts, said cage having means to discharge the coin into the chute when the retaining means is released, said displaceable means being adapted upon the insertion of an additional coin in the cage and the actuation of the latter to disengage the indicator shaft from the time shaft, and means operatively connected to the indicator shaft to show the meter is in operation.

5. A coin controlled meter including an indicator shaft, a time shaft adapted to be connected to the indicator shaft, means for connecting and disconnecting said shafts, displaceable means for effecting the operation of said connecting means, a coin chute, a coin cage arranged to be moved in and out of registration with the chute, retaining means for maintaining a coin in the cage, said displaceable means being operatively connected to the cage, actuating means arranged to move the cage and displaceable means to operate the connecting means to connect said shafts when a coin deposited in the cage is engaged by the retaining means, said movement of the cage aligning the cage with the coin chute, means for returning the actuating means and the retaining means to their original position when the actuating means is released, said cage discharging the coin into the chute when the retaining means is released, and means connecting the actuating means to the time shaft to wind the latter whereby the initial movement of the actuating member winds the time shaft and displaces the cage to effect the operative connection of said shafts.

6. A coin controlled meter including an indicator shaft, a time shaft adapted to be connected to the indicator shaft, means for connecting and disconnecting said shafts, displaceable means for effecting the operation of said connecting means, a coin chute, a coin cage arranged to be moved in and out of registration with the chute, retaining means for maintaining a coin in the cage, said displaceable means being operatively connected to the cage, actuating means arranged to move the cage and displaceable means to operate the connecting means to connect said shafts when a coin deposited in the cage is engaged by the retaining means, said movement of the cage aligning the cage with the coin chute, means for returning the actuating means and the retaining means to their original position when the actuating means is released, means for returning the cage to its original position, said cage discharging the coin into the chute when the retaining means is released, said displaceable means also being adapted to be actuated by depositing a second coin into the cage after the return of the cage to its original position, so as to move the latter to disconnect the indicator shaft from the time shaft upon the operation of the actuating means, and means operatively connected to the indicator shaft for preventing the insertion of a second coin in the cage after the expiration of a predetermined interval.

7. A coin controlled meter including an indicator shaft, a time shaft adapted to be connected to the indicator shaft, means for connecting and disconnecting said shafts, displaceable means for effecting the operation of said connecting means, a coin chute, a coin cage arranged to move in and out of registration with the chute, retaining means for maintaining a coin in the cage, means operatively connecting the displaceable means to the cage, actuating means arranged to move said cage and displaceable means to operate the connecting means to connect said shafts when a coin deposited in the cage is engaged by the retaining means, said movement of the cage aligning the cage with the coin chute, and means for returning the actuating means and the retaining means to their original position when the actuating means is released, means for returning the cage to its original position, said coin being discharged into the chute upon the release of the retaining means, and means for discharging the coin from the meter without affecting the operative connection of said shafts.

8. A coin controlled meter including an indicator shaft, a time shaft adapted to be connected to the indicator shaft, means for connecting and disconnecting said shafts, controlling means for effecting the operation of said connecting means, a coin chute, a coin cage arranged to move in and out of registration with the chute, retaining means for maintaining a coin in the cage, means operatively connecting the controlling means to the cage, actuating means arranged to move said cage and controlling means to operate the connecting means to connect said shafts when a coin deposited in the cage is engaged by the retaining means, said movement of the cage aligning the cage with the coin chute, means for returning the cage and the retaining means to their original position when the actuating means is released, said chute having a passage communicating with the outside of the meter, a movable gate for controlling the discharge of a coin through said passage, and means operatively connected to the gate and the indicator shaft for moving the gate away from the passage for a predetermined period when the indicator shaft is connected to the time shaft so as to discharge the coin deposited in the chute from the meter and for closing the gate after the expiration of a predetermined period to retain the coin in the meter.

9 A coin controlled meter including an indicator shaft, a time shaft adapted to be connected to the indicator shaft, means for connecting and disconnecting said shafts, displaceable means for effecting the operation of said connecting means, a coin chute, a coin cage arranged to move in and out of registration with the chute, retaining means for maintaining a coin in the cage, means operatively connecting the displaceable means to the cage, actuating means arranged to move said cage and displaceable means to operate the connecting means to connect said shafts when a coin deposited in the cage is engaged by the retaining means, said movement of the cage aligning the cage with the coin chute, means for returning the actuating means and the retaining means to their original position when the actuating means is released, said coin being discharged into the chute upon the release of the retaining means, chute upon the release of the retaining means, said chute having a passage communicating with the outside of the meter for removing the coin therefrom, and means operatively connected to the indicator shaft for closing said passage after the expiration of a predetermined period so as to retain the coin in the meter.

10. A coin controlled meter including an indicator shaft, a time shaft adapted to be connected to the indicator shaft, means for connecting and disconnecting said shaft, displaceable means for effecting the operation of said connecting means, a coin chute, a coin cage arranged to be moved in and out of registration with the chute, said cage having spaced slots for receiving coins of different denominations, retaining means for maintaining a coin deposited in each of said slots, means operatively connecting the displaceable means to the cage, actuating means arranged to move said cage and displaceable means to operate the connecting means to connect said shafts when a coin deposited in one of the slots is engaged by the retaining means, said movement of the cage aligning the cage with the coin chute, means for returning the actuating means and the retaining means to their original positions when the actuating means is released, means for returning the cage to its original position, means for discharging the coin deposited into the cage from the meter, said displaceable means being adapted upon the insertion of an additional coin in the cage and the operation of the latter by the actuating means within a predetermined period for disconnecting the indicator shaft from the time shaft, said displaceable means also being adapted upon the insertion of an additional coin of the proper denomination in one of the slots after the expiration of the predetermined period for disconnecting the indicator shaft from the time shaft upon the operation of the actuating means, and means for retaining the last mentioned coin within the meter.

11. A coin controlled meter including an indicator shaft, a time shaft adapted to be connected to the indicator shaft, means for connecting and disconnecting said shaft, displaceable means for effecting the operation of said connecting means, a coin chute, a coin cage arranged to be moved in and out of registration with the chute, said cage having spaced slots for receiving coins of different denominations, retaining means for maintaining a coin deposited in each of said slots, means operatively connecting the displaceable means to the cage, actuating means arranged to move said cage and displaceable means to operate the connecting means to connect said shafts when a coin deposited in one of the slots is engaged by the retaining means, said movement of the cage aligning the cage with the coin chute, means for returning the actuating means and the retaining means to their original position, means for returning the cage to its original position, said chute having a passage communicating with the outside of the meter and aligning with one of said slots, a slide associated with each of said slots for closing the same, and means operable by the indicator shaft after the expiration of a predetermined period to move the slide associated with one of the slots to close the same and after the expiration of a further predetermined period, to close the slide associated with the other of said slots.

12. A parking meter of the class described including a time shaft, a meter shaft arranged to be connected to the time shaft, said meter shaft having an indicator connected thereto, a cage adapted to be moved from its normal inoperative position, means operable by the movement of the cage alternately to connect and disconnect said shafts, said cage having a bell crank pivotally connected thereto, operating means arranged to engage one end of said bell crank so as to move the cage to effect the operative connection of said shafts upon the initial actuation of the operating means, means to return the cage to its normal position, said bell crank being operable to actuate the cage whereby to disconnect said shafts after the cage has been returned to its normal position, and lost motion means connecting the other end of said bell crank to the meter shaft to permit the independent movement of said bell crank relative to the meter shaft and for effecting the actuation of said bell crank by the meter shaft after the latter has been in operation for a predetermined period.

13. A parking meter of the class described including a time shaft, a meter shaft arranged to be connected to the time shaft, said meter shaft having an indicator connected thereto, a cage adapted to be moved from its normal inoperative position, means operable by the movement of the cage alternately to connect and disconnect said shafts, said cage having a bell crank pivotally connected thereto, operating means arranged to engage one end of said bell crank so as to move the cage to effect the operative connection of said shafts upon the initial actuation of the operating means, means to return the cage to its normal position, said bell crank being operable to actuate the cage whereby to disconnect said shafts after the cage has been returned to its normal position, lost motion means connecting the other end of said bell crank to the meter shaft to permit the independent movement of said bell crank relative to the meter shaft, and for effecting the actuation of said bell crank by the meter shaft after the latter has been in operation for a predetermined period, said cage after the expiration of the predetermined period being operable by the insertion of a coin therein and the actuation of the operating means to disconnect said shafts, and means operatively connected to the meter shaft for indicating the meter is being operated.

14. A meter of the class described including a driving member, an indicator adapted to be connected to and disconnected from said driving member, means for connecting and disconnecting said driving member and indicator, a displaceable member associated with said connecting means whereby in one position of said displaceable member, said driving member and indicator are connected, and in a second position, they are disconnected, a control member associated with said displaceable member to control the position thereof, movable means for actuating said control member whereby to determine the position of said displaceable member, releasable means for actuating the movable means to operate said control member, means for returning the releasable means to its original position, means for returning the movable means to its original position without affecting the operative connection of the indicator with the driving member, and means operable by the displaceable member for indicating when the meter is in operation.

15. A coin control meter including a driving member, an indicator adapted to be connected to the driving member, means for connecting and disconnecting the indicator to the driving member, a displaceable member for effecting the operation of said connecting means, a control member associated with the displaceable member for controlling the operation thereof, a movable coin cage operatively connected to the control member, releasable means arranged upon the depositing of a coin into the cage to engage the coin, means for actuating the releasable means when the latter engages the coin so as to move the cage to effect the operation of the control member and the displaceable member to connect the indicator with the driving member, and means for returning the coin.

16. A coin control meter including a driving member, an indicator adapted to be connected to the driving member, means for connecting and disconnecting the indicator to the driving member, a displaceable member for effecting the operation of said connecting means, a control member associated with the displaceable member for controlling the operation thereof, a movable coin cage operatively connected to the control member, releasable means associated with the cage and arranged when a coin is deposited into the cage to engage the coin, means for actuating the releasable means when the latter engages the coin so as to effect the operation of the control member and the displaceable member to connect the indicator with the driving member, means for returning the releasable means to its original position, means for returning the cage to its original position without affecting the operative connection of the indicator with the driving member, and means for discharging the coin from the meter upon the return of the releasable means to its original position, said control member arranged upon the depositing of another coin into the cage and the subsequent movement of the cage by the releasable means, to operate the control member and the displaceable member to effect disconnection of the indicator from the driving member.

17. A coin control meter including a driving member, an indicator adapted to be connected to the driving member, means for connecting and disconnecting the indicator to the driving member, a displaceable member for effecting the operation of said connecting means, a control member associated with the displaceable member for controlling the operation thereof, a movable coin cage operatively connected to the control member, releasable means arranged upon the depositing of a coin of the proper denomination within the cage to engage the coin, means for actuating the releasable means when the latter engages the coin so as to move the latter so as to operate the control member and the displaceable member to connect the indicator with the driving member, means for returning the releasable member to its original position, means for returning the cage to its original position without affecting the operative connection of the indicator with the driving member, means for discharging the coin from the meter when the releasable means is returned to its original position, said releasable means when a second coin is deposited into the cage within a predetermined period being operable to move the cage so as to actuate the control member and the displaceable member to disconnect the indicator from the driving member, said second coin being removed through the coin discharging means, and means connected to the indicator and operable after the expiration of the predetermined period for retaining the second coin within the meter if the same is deposited into the cage when the predetermined period has expired.

18. A coin control meter including a driving member, an indicator adapted to be connected to the driving member, means for connecting and disconnecting the indicator to the driving member, a displaceable member for effecting the operation of said connecting means, a control member associated with the displaceable member for controlling the operation thereof, a movable coin cage operatively connected to the control member, releasable means arranged upon the depositing of a coin of the proper denomination within the cage to engage the coin, means for actuating the releasable means when the latter engages the coin as to move the latter so as to operate the control member and the displaceable member to connect the indicator with the driving member, means for returning the releasable member to its original position, means for returning the cage to its original position without affecting the operative connection of the indicator with the driving member, means for withdrawing the coin from the meter when the releasable means is returned to its original position, said releasable means when a second coin is deposited into the cage within a predetermined period being operable to move the cage so as to actuate the control member and the displaceable member to disconnect the indicator from the driving member, means when a second coin is deposited within the cage for actuating the same after the expiration of a predetermined period, so as to disconnect the indicator from the driving member, to retain the second coin within the meter, and independently operable means adapted to be connected to the indicator to disconnect the same from the driving member.

19. A meter of the class described including a driving member, an indicator adapted to be connected to and disconnected from said driving member, means for connecting and disconnecting said driving member and indicator, a displaceable member associated with said connecting means whereby in one position of said displaceable member said driving shaft and indicator are connected and in a second position they are disconnected, a coin chute within the meter, said chute having an opening communicating with the outside of the meter, and a discharge passage communicating with the inside of the meter, a coin cage arranged to be moved in and out of registration with the chute, retaining means for maintaining a coin in the cage, actuating means arranged to move the retaining means and the cage to operate the displaceable member and the control member when a coin deposited in the cage is engaged by the retaining means, the movement of the cage aligning the same with the coin chute, means for returning the actuating means to its oriignal position, means for returning the cage to its original position without affecting the operative connection of the indicator with the driving member, said coin when the actuating means is withdrawn being discharged from the chute through said opening, and means operatively connected to the driving member for closing the opening in said chute at the expiration of a predetermined period whereby a second coin deposited into the cage for the purpose of moving the cage and the displaceable member, will be discharged through said opening when deposited at any time within a predetermined period and will be conducted to the discharge passage of the chute when deposited after the expiration of the predetermined period.

20. A coin control meter including a driving member, an indicator adapted to be connected to the driving member, means for connecting and disconnecting the indicator to the driving member, a displaceable member for effecting the operation of said connecting means, a control member associated with the displaceable member for controlling the operation thereof, a movable coin cage operatively connected to the control member, said cage having spaced slots arranged to receive coins of different denominations, an actuating member arranged upon the depositing of a coin of the proper denomination into one of said slots to move the cage to effect the operation of the control member and the displaceable member to connect the indicator with the driving member, means for returning the displaceable member to its original position, means for discharging the coin from the cage and means operatively connected to said driving member and movable to close one of said slots after the expiration of a predetermined interval to prevent a coin being inserted therein.

21. A coin control meter including a driving member, an indicator adapted to be connected to the driving member, means for connecting and disconnecting the indicator to the driving member, a displaceable member for effecting the operation of said connecting means, a control member associated with the displaceable member for controlling the operation thereof, a movable coin cage operatively connected to the control member, said cage having spaced slots arranged to receive coins of different denominations, means for actuating said cage when a coin is deposited in one of the slots, and means movable in said slots and operatively connected to the driving member for sequentially closing the slots after the expiration of predetermined periods so as to permit only coins of the proper denomination being deposited into the cage.

22. A coin control meter including a driving member, an indicator adapted to be connected to the driving member, means for connecting and disconnecting the indicator to the driving member, a displaceable member for effecting the operation of said connecting means, a control member associated with the displaceable member for controlling the operation thereof, a movable coin cage operatively connected to the control member, releasable means arranged upon the depositing of a coin into the cage to move the latter to effect the operation of the control member and the displaceable member to connect the indicator with the driving member, means for actuating the control member, and means for returning the coin, said releasable means being operable to actuate the cage only when a coin of the proper denomination is inserted within the cage.

JOHN W. BULLOCK.
CLARENCE W. CLEMENTZ.